United States Patent [19]

Ogawa et al.

[11] 4,455,336
[45] Jun. 19, 1984

[54] CERAMIC HONEYCOMB STRUCTURAL BODIES

[75] Inventors: Yutaka Ogawa, Nagoya; Seiichi Asami, Okazaki, both of Japan

[73] Assignee: NGK Insulators, Ltd., Japan

[21] Appl. No.: 446,512

[22] Filed: Dec. 3, 1982

Related U.S. Application Data

[63] Continuation of Ser. No. 240,501, Mar. 4, 1981, abandoned.

[30] Foreign Application Priority Data

Mar. 14, 1980 [JP] Japan .................. 55-32232

[51] Int. Cl.$^3$ ............................... B23B 3/12
[52] U.S. Cl. .................. 428/116; 428/188; 502/527
[58] Field of Search ........... 252/477 R; 428/73, 116, 428/117, 118, 188; 502/527

[56] References Cited

U.S. PATENT DOCUMENTS

| | | | |
|---|---|---|---|
| 3,249,659 | 5/1966 | Voelker | 428/117 X |
| 3,799,796 | 3/1974 | Hunter | 428/118 X |
| 3,904,551 | 9/1975 | Lundsager et al. | 252/477 R X |
| 3,905,775 | 9/1975 | Soward et al. | 428/116 X |
| 3,963,504 | 6/1976 | Lundsager | 252/477 R X |
| 4,072,007 | 2/1978 | Sanday | 252/477 R |
| 4,233,351 | 11/1980 | Okumura et al. | 428/116 |
| 4,253,992 | 3/1981 | Soejima | 252/477 R |
| 4,294,806 | 10/1981 | Abe et al. | 252/477 R X |

FOREIGN PATENT DOCUMENTS 49-88908 8/1974 Japan .
53-34373 8/1978 Japan .
53-133860 10/1978 Japan .

Primary Examiner—Henry F. Epstein
Attorney, Agent, or Firm—Parkhurst & Oliff

[57] ABSTRACT

A ceramic honeycomb structural body having a high strength wherein the outer peripheral portion including an outer peripheral wall or a part extending from the end surface of the honeycomb body has a smaller porosity than the other portion. Such a ceramic honeycomb structural body is produced by filling pores in the above defined portion of the honeycomb body with a ceramic material having a smaller porosity than the ceramic honeycomb body material.

3 Claims, 6 Drawing Figures

CERAMIC HONEYCOMB STRUCTURAL BODIES

This is a continuation of Ser. No. 240,501 filed Mar. 4, 1981 and now abandoned.

The present invention relates to ceramic honeycomb structural bodies to be used for, e.g., a catalyst support for purifying exhaust gases of an internal combustion engine, as well as many other uses.

In general, ceramic honeycomb bodies have a surface area per unit volume, are excellent in heat resistance, and are used for, e.g., a catalyst support for purifying exhaust gas in an internal combustion engine as well as many other uses. It is desirable, for the purpose of improving the function of the honeycomb body, that partition walls defining the channels of the honeycomb body are thinner and larger in the porosity. However, when the partition walls are thinner and the porosity is increased, the mechanical strength of the honeycomb body itself is lowered. When a honeycomb body is practically used, said body is put in a holder and set in an equipment, for example an internal combustion engine system, and the body is apt to be chipped off. Another practical problem is that when a clamping pressure of the holder for preventing vibration is increased, the honeycomb body is apt to be cracked.

To prevent these drawbacks, the following methods have been proposed:

(1) Coating of a glaze only on an outer peripheral wall surface of a honeycomb body (Japanese Utility Model Laid Open Application No. 133,860/78);

(2) Coating of heat resistant glass ceramic powders only on an outer peripheral wall (Japanese Utility Model Application Publication No. 34,373/78); and (3) Thickening the outer peripheral wall of a ceramic honeycomb body by integrally extruding method (Japanese Patent Laid Open Application No. 88,908/74).

However, these proposals can not expect the satisfactory improvement of the strength of the honeycomb body.

A goal of the present invention is to remove these defects and this is accomplished by making ceramic honeycomb bodies wherein the porosity of the partition walls of channels of the honeycomb body at the outer peripheral portion, including the outer peripheral wall, is smaller than that of the other portion.

The low strength of the porous ceramic honeycomb body is due to the fact that the portion occupied by pores in the partition walls forming the channels is large while the portion contributing to substantially developing the strength is small, and at the portions where the pores are exposed at the partition wall as shown in FIG. 1, the external stress is locally concentrated. Accordingly, it can be expected that the strength of the ceramic honeycomb body is improved by filling the pores in the partition wall with a material having a smaller porosity to make the partition wall surface flat.

In order to prevent the honeycomb body from slippage caused by vibration, both ends of the body are generally clamped between two flanges which are projected inwardly in a holding vessel from the inner surface thereof, when the honeycomb body is held in the holding vessel. In this case, the flow channels extend inwardly several millimeters from the outer periphery of the honeycomb body and are closed by the flange. These slow channels do not allow for the passage of a fluid flow.

In the present invention, the porosity of the partition wall of the channels at the above described portion which do not permit fluid flow are reduced to strengthen the honeycomb body. Unless the portion wherein the pores are to be filled with a material having a lower porosity includes the partition walls of channels at the inside of the outer periphery as well as the outer peripheral wall, a satisfactory improvement of the strength can not be obtained. However, if one wishes to prevent chipping off mainly at the end corner portions, even if the honeycomb body is not treated along the total length in the longitudinal direction of the channels, this effect can be attained by treating the partition wall to a given depth from the end portion as shown in FIG. 3.

The coating materials are preferably ceramic materials, which have a lower porosity than that of the raw material of the honeycomb body and contain a small amount of flux component in order to tightly fit to the inner portion of pores and the partition wall.

The present invention will now be explained in greater detail.

For better understanding the invention, reference is taken to the accompanying drawings, wherein:

FIGS. 1(A) and (B) show the fragmentary cross-sectional views of a part of the partition wall of a ceramic honeycomb body before and after the coating treatment is carried out respectively;

Figure 1A:
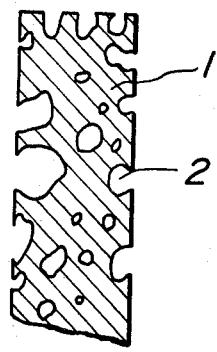
Figure 1B:
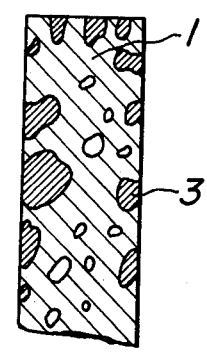
Figure 2A:
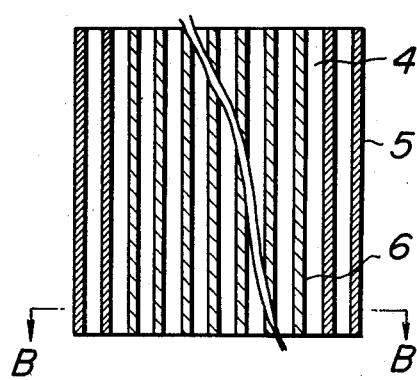
FIG. 2(A) is a vertical cross-sectional view of a honeycomb structural body wherein the partition walls at the outer peripheral portion are treated according to the present invention along the entire length of the channels.
Figure 2B:
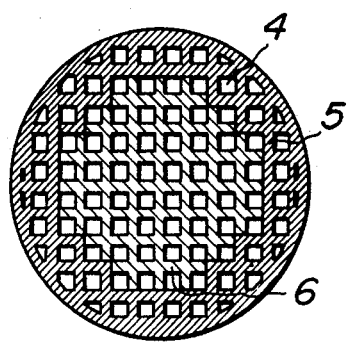
FIG. 2(B) is a cross-sectional view taken along the line B—B in FIG. 2(A)
Figure 3A:
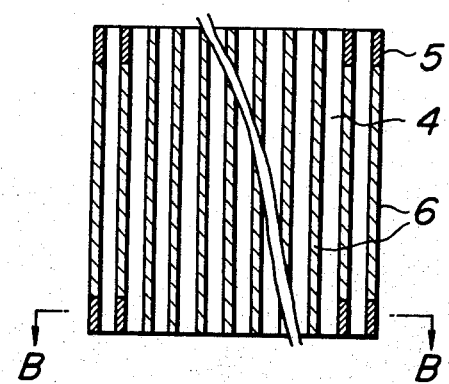
FIG. 3(A) is a vertical cross-sectional view of a honeycomb structural body wherein a part of the partition wall extending from the opening ends is treated.
Figure 3B:
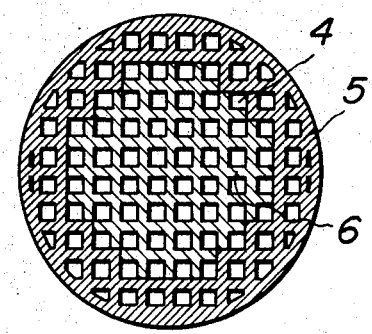
FIG. 3(B) is a cross-sectional view taken along the line B—B in FIG. 3(A).

In FIG. 1, the numerals 1, 2 and 3 represent the ceramic honeycomb body material, open pore portion and coating material filled in the open pore portion of partition wall of ceramic honeycomb body, respectively. In FIGS. 2 and 3, the numerals 4, 5 and 6 respectively represent the channels extending therethrough, the low porosity partition wall treated with coating material and the partition wall without the coating.

The following examples are given for the purpose of illustration of this invention and are not intended as limitations thereof.

EXAMPLE 1

As a ceramic honeycomb body to be reinforced, use was made of a fired cordierite ceramic honeycomb body having an outer diameter of 90 mm, a length of 110 mm, a thickness partition wall thickness of 0.3 mm, an outer peripheral wall thickness of 0.3 mm and channel number per 1 inch$^2$ being about 300.

The reinforcing materials were prepared by adding to 100 parts by weight of each of three powdery compositions A, B and C having Seger formula as shown in the following table, 35–45 parts by weight of water and 2 parts by weight of a binder of carboxymethylcellulose to form slurries.

|   | Seger formula (molar ratio) | | | | | Grain size of mixed batch |
|---|---|---|---|---|---|---|
|   | KNaO | CaO | MgO | Al$_2$O$_3$ | SiO$_2$ |   |
| A | 0.22 | 0.05 | 0.73 | 0.86 | 4.91 | −200 mesh |
| B | 0.16 | 0.04 | 0.80 | 0.92 | 4.33 | −200 mesh |
| C | 0.10 | 0.03 | 0.87 | 0.93 | 3.13 | −200 mesh |

Two types of honeycomb body samples were prepared as follows. In one sample type of honeycomb body, the part which is not to be treated with the slurry was masked and the entire honeycomb body was dipped in the slurry. In another type sample of honeycomb body, only 10 mm of both ends of the peripheral channels were dipped in the slurry. Before these two dipped samples were dried, the superfluous slurry was scattered and removed with compressed air and the slurry protruded on the outer peripheral wall was wiped off. The reason why the outer peripheral wall is wiped off is that if the coated layer remained on the outer peripheral wall, the outer diameter size would be varied. Thereafter, water is dried and removed and the thus treated honeycomb structural body was fired at 1370°–1400° C. for 12 hours by an oxidizing condition. For comparison, a honeycomb structural body, only the outer peripheral wall surface of which is coated with the slurry, was prepared.

The reinforcing effect was estimated in the following manner. The impact breaking energy of the treated portion was determined by Chalpy Impact Tester and the compression strength was determined by using a jig matched to the outer peripheral shape of the honeycomb structural body by means of a universal testing machine. The obtained results are shown in the following Table 1. Furthermore, the treated portion was cut off and the cut portion was measured with respect to the properties of the partition wall and are shown in the following Table 2.

TABLE 1

(average value of five samples)

|   |   | Treating material | | | Not treated |
|---|---|---|---|---|---|
|   | Coated portion | A | B | C |   |
| Impact breaking energy (kg · cm) | Outer peripheral wall and entire length | 4.5 | 4.3 | 3.7 | 1.5 |
|   | Outer peripheral wall and 10 mm depth |   |   |   |   |
|   | Outer peripheral wall | 2.3 | 2.3 | 2.0 |   |
| Compression breaking load (kg) | Outer peripheral wall and entire length | 3130 | 3050 | 2780 |   |
|   | Outer peripheral wall and 10 mm depth | 2070 | 2050 | 2000 | 1660 |
|   | Outer peripheral wall | 2010 | 1990 | 1980 |   |

TABLE 2

|   | Treating material | | | Not treated |
|---|---|---|---|---|
|   | A | B | C |   |
| Porosity | 25.0 | 27.4 | 31.0 | 37.0 |

TABLE 2-continued

|   | Treating material | | | Not treated |
|---|---|---|---|---|
|   | A | B | C |   |
| (vol %) |   |   |   |   |
| Flexural strength (kg/cm$^2$) | 210 | 180 | 170 | 50 |
| Thermal expansion coefficient ($\times 10^{-6}$/°C.) | 1.9 | 1.8 | 1.6 | 1.0 |
| Softening temperature (°C.) | 1150 | 1210 | 1280 | 1410 |

As seen from the above example, the ceramic honeycomb structural bodies obtained according to the present invention, in which the inner walls of the channels have also been treated with the slurry, have an impact breaking energy maximum which is about 3 times as high as the honeycomb body not treated with the slurry and about 2 times as high as the honeycomb body in which only the outer peripheral wall surface has been treated. Furthermore, with respect to compression strength, the honeycomb structural bodies wherein the outer peripheral wall surface and the entire length of the channels were treated, had a maximum about 1.9 times as high as the honeycomb body not treated and about 1.5 times as high as the honeycomb body wherein only the outer peripheral wall surface has been treated. As seen from Table 2, the properties are slightly different depending upon the applying composition, but said composition may be selected considering the other performance required in the ceramic honeycomb body, for example the softening temperature and the like.

Thus, the ceramic honeycomb structural bodies obtained according to the present invention are not broken even if the clamping pressure is increased when said body is held by a holding vessel. The result is that even when the honeycomb structural bodies are vibrated in a metal vessel and strike the inner wall of the vessel, said bodies are rarely broken. The prevention of chipping off at the end portions of the honeycomb body due to vibration can be attained by reinforcing the vicinity of both end portions where cracking is readily caused.

What is claimed is:

1. A ceramic honeycomb structural body, comprising:
    an outer peripheral portion which comprises an outer peripheral wall and longitudinal channels formed by longitudinal porous walls, the longitudinal porous walls having transverse cross-sections; and
    a central portion contiguous with the outer peripheral portion, and having longitudinal channels formed by longitudinal porous walls, the longitudinal porous walls of said central portion being transversely more porous than the transverse portion of longitudinal porous walls of said outer peripheral portion, the longitudinal channels of said outer peripheral portion being open.

2. The ceramic honeycomb structural body, as claimed in claim 1, wherein the decreased transverse porosity walls of said outer peripheral portion extends only partially along the longitudinal porous walls from an end surface of the honeycomb structural body.

3. The ceramic honeycomb structural body as claimed in claim 1, wherein a plurality of pores located in the longitudinal porous walls of the outer peripheral portion are transversely filled with a material having a smaller porosity than that of the material of the honeycomb structural body.

* * * * *